(12) United States Patent
Carapelli et al.

(10) Patent No.: US 9,972,159 B2
(45) Date of Patent: May 15, 2018

(54) FUEL DISPENSING ENVIRONMENT UTILIZING ACTIVE SNIFFER TO UPGRADE LEGACY EQUIPMENT

(71) Applicant: Gilbarco Inc., Greensboro, NC (US)

(72) Inventors: Giovanni Carapelli, High Point, NC (US); Thomas J. Park, Greensboro, NC (US)

(73) Assignee: Gilbarco Inc., Greensboro, NC (US)

( * ) Notice: Subject to any disclaimer, the term of this patent is extended or adjusted under 35 U.S.C. 154(b) by 656 days.

(21) Appl. No.: 14/511,993

(22) Filed: Oct. 10, 2014

(65) Prior Publication Data

US 2015/0105920 A1  Apr. 16, 2015

Related U.S. Application Data

(60) Provisional application No. 61/901,494, filed on Nov. 8, 2013, provisional application No. 61/889,431, filed on Oct. 10, 2013.

(51) Int. Cl.
  *G05D 7/06* (2006.01)
  *G07F 13/02* (2006.01)
  (Continued)

(52) U.S. Cl.
  CPC .......... *G07F 13/025* (2013.01); *G06Q 20/18* (2013.01); *G06Q 20/322* (2013.01); *B67D 7/04* (2013.01)

(58) Field of Classification Search
  None
  See application file for complete search history.

(56) References Cited

U.S. PATENT DOCUMENTS

| 4,967,366 A | 10/1990 | Kaehler |
| 5,689,071 A | 11/1997 | Ruffner et al. |

(Continued)

FOREIGN PATENT DOCUMENTS

| EP | 1681778 A2 | 7/2006 |
| EP | 1804475 A3 | 4/2014 |

(Continued)

OTHER PUBLICATIONS

Smart Card Alliance. "Contactless Payment and the Retail Point of Sale: Applications, Technologies and Transaction Models" [online]. Dated Mar. 2003. Retrieved on Nov. 10, 2012 (Nov. 10, 2012). Retrieved from the Internet at URL: <http://www.it.iitb.ac.in/~tijo/seminar/Contactless_Pmt_Report.pdf>, all enclosed pages cited.

(Continued)

*Primary Examiner* — Van Nguyen
(74) *Attorney, Agent, or Firm* — Nelson Mullins Riley & Scarborough, LLP

(57) ABSTRACT

An assembly for installation in a fuel dispensing environment having a forecourt controller and at least one fuel dispenser communicating via legacy cable. The assembly comprises a sniffer device connectable along the legacy cable such that a first communication side thereof is in electrical communication with the forecourt controller and a second communication side thereof is in electrical communication with the fuel dispenser. The sniffer device is operative to receive an incoming message at either the first communication side or the second communication side. The sniffer device also includes memory and a processor, the processor implementing instructions to interpret the incoming message. Based on an interpretation of the incoming message, the sniffer device is operative to determine an action to be taken regarding the incoming message.

23 Claims, 5 Drawing Sheets

(51) Int. Cl.
*G06Q 20/18* (2012.01)
*G06Q 20/32* (2012.01)
*B67D 7/04* (2010.01)

(56) References Cited

U.S. PATENT DOCUMENTS

| | | | |
|---|---|---|---|
| 5,734,851 A | 3/1998 | Leatherman et al. | |
| 5,859,416 A | 1/1999 | Gatto | |
| 5,956,259 A | 9/1999 | Hartsell, Jr. et al. | |
| 6,052,629 A | 4/2000 | Leatherman et al. | |
| 6,073,840 A | 6/2000 | Marion | |
| 6,089,284 A | 7/2000 | Kaehler et al. | |
| 6,098,879 A | 8/2000 | Terranova | |
| 6,116,505 A | 9/2000 | Withrow | |
| 6,152,591 A * | 11/2000 | McCall | B67D 7/106 235/380 |
| 6,176,421 B1 * | 1/2001 | Royal, Jr. | B67D 7/222 235/381 |
| 6,360,138 B1 * | 3/2002 | Coppola | G06Q 20/341 700/231 |
| 6,364,206 B1 | 4/2002 | Keohane | |
| 6,422,464 B1 | 7/2002 | Terranova | |
| 6,435,204 B2 | 8/2002 | White et al. | |
| 6,442,448 B1 * | 8/2002 | Finley | B67D 7/145 700/231 |
| 6,704,774 B2 | 3/2004 | Terranova | |
| 6,741,909 B2 | 5/2004 | Leatherman et al. | |
| 6,769,607 B1 | 8/2004 | Pitroda et al. | |
| 6,813,609 B2 | 11/2004 | Wilson | |
| 6,882,900 B1 | 4/2005 | Terranova | |
| 6,935,191 B2 | 8/2005 | Olivier et al. | |
| 7,031,945 B1 | 4/2006 | Donner | |
| 7,039,389 B2 | 5/2006 | Johnson, Jr. | |
| 7,255,264 B2 | 8/2007 | de Leon | |
| 7,280,087 B2 | 10/2007 | Williams et al. | |
| 7,289,877 B2 | 10/2007 | Wilson | |
| 7,408,758 B2 * | 8/2008 | Myers | H05F 3/02 361/215 |
| 7,546,251 B1 | 6/2009 | Leatherman et al. | |
| 7,562,813 B2 | 7/2009 | Humphries et al. | |
| 7,574,377 B2 | 8/2009 | Carapelli | |
| 7,607,576 B2 * | 10/2009 | Robertson | G06Q 20/3674 235/375 |
| 7,664,885 B2 | 2/2010 | Carapelli | |
| 7,774,231 B2 | 8/2010 | Pond et al. | |
| 8,009,032 B2 * | 8/2011 | Long | G06F 21/554 340/500 |
| 8,032,414 B2 | 10/2011 | Payne et al. | |
| 8,342,407 B2 | 1/2013 | Williams et al. | |
| 8,386,322 B2 | 2/2013 | Williams et al. | |
| 8,577,734 B2 | 11/2013 | Treyz et al. | |
| 8,666,542 B2 * | 3/2014 | Durham | F02D 41/26 700/236 |
| 8,897,708 B2 | 11/2014 | Witkowski et al. | |
| 8,925,808 B2 | 1/2015 | Harrell | |
| 8,939,361 B2 | 1/2015 | Stoudt et al. | |
| 8,983,137 B2 | 3/2015 | Hradetzky | |
| 9,047,596 B2 | 6/2015 | Williams et al. | |
| 9,053,503 B2 * | 6/2015 | Carapelli | G06Q 20/202 |
| 9,458,004 B2 * | 10/2016 | Schulze | F17C 5/06 |
| 2003/0200108 A1 | 10/2003 | Malnoe | |
| 2004/0030601 A1 | 2/2004 | Pond et al. | |
| 2004/0050648 A1 | 3/2004 | Carapelli | |
| 2004/0182921 A1 | 9/2004 | Dickson et al. | |
| 2004/0254861 A1 | 12/2004 | Pentel | |
| 2005/0000974 A1 | 1/2005 | Chirnomas | |
| 2005/0029358 A1 | 2/2005 | Mankins | |
| 2005/0085226 A1 | 4/2005 | Zalewski et al. | |
| 2005/0184145 A1 | 8/2005 | Law et al. | |
| 2005/0184155 A1 | 8/2005 | Pinkus | |
| 2005/0192832 A1 | 9/2005 | Call et al. | |
| 2006/0266822 A1 | 11/2006 | Kelley et al. | |
| 2007/0022058 A1 | 1/2007 | Labrou et al. | |
| 2007/0057038 A1 | 3/2007 | Gannon | |
| 2007/0152035 A1 | 7/2007 | Adams et al. | |
| 2007/0156436 A1 | 7/2007 | Fisher et al. | |
| 2007/0190939 A1 | 8/2007 | Abel | |
| 2008/0040287 A1 | 2/2008 | Harrell et al. | |
| 2008/0154735 A1 | 6/2008 | Carlson | |
| 2008/0191878 A1 | 8/2008 | Abraham | |
| 2008/0248815 A1 | 10/2008 | Busch | |
| 2008/0308628 A1 | 12/2008 | Payne et al. | |
| 2009/0048708 A1 | 2/2009 | DeLine | |
| 2009/0048710 A1 | 2/2009 | DeLine | |
| 2009/0084840 A1 | 4/2009 | Williams et al. | |
| 2009/0129403 A1 | 5/2009 | Harrell et al. | |
| 2009/0259590 A1 | 10/2009 | Carapelli | |
| 2009/0265638 A1 | 10/2009 | Carapelli et al. | |
| 2010/0051689 A1 | 3/2010 | Diamond | |
| 2010/0133335 A1 | 6/2010 | Maguid et al. | |
| 2010/0268612 A1 | 10/2010 | Berrio et al. | |
| 2011/0057790 A1 | 3/2011 | Martin et al. | |
| 2011/0112866 A1 | 5/2011 | Gerrans | |
| 2011/0185319 A1 | 7/2011 | Carapelli | |
| 2013/0054315 A1 | 2/2013 | Shutter | |
| 2013/0121428 A1 | 5/2013 | Carapelli et al. | |
| 2013/0232019 A1 * | 9/2013 | Frieden | G06Q 20/3278 705/17 |
| 2013/0246171 A1 | 9/2013 | Carapelli | |
| 2014/0006188 A1 | 1/2014 | Grigg et al. | |
| 2014/0074714 A1 | 3/2014 | Melone et al. | |
| 2014/0089174 A1 | 3/2014 | Carapelli et al. | |
| 2014/0114473 A1 | 4/2014 | McNinch | |
| 2014/0172157 A1 | 6/2014 | Bellamy, III et al. | |
| 2015/0032558 A1 | 1/2015 | Bonk et al. | |
| 2015/0106196 A1 | 4/2015 | Williams et al. | |
| 2015/0120476 A1 | 4/2015 | Harrell | |
| 2015/0142588 A1 | 5/2015 | Hum et al. | |
| 2015/0143116 A1 | 5/2015 | Tang et al. | |

FOREIGN PATENT DOCUMENTS

| | | |
|---|---|---|
| WO | 2012004771 A1 | 1/2012 |
| WO | 2013040169 A1 | 3/2013 |

OTHER PUBLICATIONS

International Search Report and Written Opinion dated Nov. 27, 2012 (Nov. 27, 2012), PCT Application No. PCT/US2012/055098, International Filing Date Sep. 13, 2012 (Sep. 13, 2012), all enclosed pages cited.

International Search Report and Written Opinion dated Jan. 26, 2015 (Jan. 26, 2015), PCT Application No. PCT/US2014/060132, International Filing Date Oct. 10, 2014 (Oct. 10, 2014), all enclosed pages cited.

International Search Report and Written Opinion dated Jan. 29, 2015 (Jan. 29, 2015), corresponding PCT Application No. PCT/US2014/060049, International Filing Date Oct. 10, 2014 (Oct. 10, 2014), all enclosed pages cited.

Extended European Search Report dated Apr. 12, 2017 in corresponding European Application No. EP 14851584.4 all enclosed pages cited.

Extended Search Report dated Feb. 15, 2017 in corresponding European patent application No. 14851893.9, all enclosed pages cited.

Eurasian Official Notification dated Oct. 31, 2017 in corresponding patent application serial No. 201690729, all enclosed pages cited.

Eurasian Official Notification dated Oct. 31, 2017 in co-pending patent application serial No. 201690727, all enclosed pages cited.

Chinese Office Action dated Feb. 5, 2018 in corresponding patent application serial No. 201480066938.1, all enclosed pages cited.

Non-final Office Action dated Jan. 19, 2018 in co-pending U.S. Appl. No. 14/510,874, all enclosed pages cited.

Final Office Action dated Aug. 29, 2017 in corresponding U.S. Appl. No. 14/510,874, all inclosed pages cited.

Office Action dated Sep. 6, 2017 in corresponding Mexican patent application serial No. MX/a/2016/004549, all enclosed pages cited.

* cited by examiner

FUEL DISPENSING ENVIRONMENT UTILIZING ACTIVE SNIFFER TO UPGRADE LEGACY EQUIPMENT

PRIORITY CLAIM

This application is based upon and claims the benefit of U.S. provisional application Ser. No. 61/889,431, filed Oct. 10, 2013 and U.S. provisional application Ser. No. 61/901,494, filed Nov. 8, 2013. Both of the foregoing applications are incorporated fully herein by reference.

FIELD OF THE INVENTION

The present invention relates generally to service stations at which fuel is dispensed. More particularly, the present invention relates to installation and use of a sniffer to upgrade legacy fueling equipment.

BACKGROUND

Transaction processing within a retail fueling environment conventionally includes interaction between a customer and a fuel dispenser. The customer typically presses certain keys on a user interface provided on the fuel dispenser to provide input for a transaction. Output is provided to the customer in response by the user interface (typically via a visual display). The customer obtains payment authorization for the transaction by swiping a credit card at the fuel dispenser (also referred to as "pay at the pump") or communicating with an employee situated at a point of sale (POS) terminal. After authorization is received, the customer dispenses fuel and interacts with the user interface of the fuel dispenser to complete the transaction. An example of such a fuel dispenser interface is the card reader in dispenser (CRIND®) equipped fuel dispenser manufactured by Gilbarco Inc.

Toward this end, existing fuel service forecourts are typically equipped with field wiring to provide communication between a forecourt controller (FCC) and the individual fuel dispensers. As known to those skilled in the art, the FCC may be a separate box that communicates with the POS, or the functionality of the FCC may be incorporated into the POS. In either case, the FCC controls the operation of the fuel dispensers. Also, in the case of "pay at the pump," the POS receives payment information from the fuel dispensers in order to authorize the transaction and effect final payment. Recently, Gilbarco Inc., the assignee of the present invention, has proposed a system wherein certain forecourt functions are performed by a separate device (referred to as an "enhanced dispenser hub") that communicates with a POS. The operation of an enhanced dispenser hub in a fueling environment is described in U.S. Pat. No. 8,438,064, incorporated fully herein by reference for all purposes.

The prior art typically uses two-wire current loop or RS422 signaling for communications between the FCC and the fuel dispensers (or other forecourt devices). Recently, the functionality desired at fuel dispensers has outgrown the limited capability that can be achieved with legacy field wiring. For example, in recent years, fuel dispensers have become more than a means for fueling a vehicle. Service station owners are advertising at the dispenser with everything from simple signs to video displays running commercials. These data-intensive features can be readily provided in a new service station because high bandwidth cable can be installed in the forecourt during construction. In the case of existing service stations, the cost to provide high bandwidth cable (e.g., Cat5) in the forecourt can be prohibitive.

In addition, there have been recent efforts to effect payment for various goods and services via mobile devices such as cell phones. From the standpoint of a service station operator, it would be desirable to retrofit existing fuel dispensers to accept "mobile payment" as an additional payment option. While desirable in theory, such retrofitting is difficult to achieve in practice. For example, various "mobile payment" techniques may require communication between the fuel dispenser and a host server at data rates higher than can be achieved using legacy field wiring. In addition, the retrofit option may require compatibility with fuel dispensers and/or FCCs from various manufacturers.

SUMMARY OF CERTAIN ASPECTS

The present invention recognizes and addresses the foregoing considerations, and others, of prior art construction and methods. In this regard, certain exemplary and nonlimiting aspects of the present invention will now be described. These aspects are intended to provide some context for certain principles associated with the present invention, but are not intended to be defining of the full scope of the present invention.

Certain aspects of the present invention are directed to a system for upgrading legacy fuel dispensing equipment (or other kiosks or payment terminals) to have additional capability. Examples of retail fueling environments, fuel dispensers, and user interfaces for fuel dispensers are provided in U.S. Pat. No. 6,435,204 (entitled "Fuel Dispensing System"), U.S. Pat. No. 5,956,259 (entitled "Intelligent Fueling"), U.S. Pat. No. 5,734,851 (entitled "Multimedia Video/Graphics in Fuel Dispensers"), U.S. Pat. No. 6,052,629 (entitled "Internet Capable Browser Dispenser Architecture"), U.S. Pat. No. 5,689,071 (entitled "Wide Range, High Accuracy Flow Meter"), U.S. Pat. No. 6,935,191 (entitled "Fuel Dispenser Fuel Flow Meter Device, System and Method"), U.S. Pat. No. 7,289,877 (entitled "Fuel Dispensing System for Cash Customers") and U.S. Pat. No. 7,774,231 (entitled "Electronic Payment Methods for a Mobile Device") and U.S. published patent application nos. 20090048710 (entitled "Fuel Dispenser"), 20100268612 (entitled "Payment Processing System for Use in a Retail Environment Having Segmented Architecture"), and 20110185319 (entitled "Virtual PIN Pad for Fuel Payment Systems"). The entire disclosure of each of the foregoing patents and applications is hereby incorporated by reference as if set forth verbatim herein for all purposes.

In this regard, some aspects of the present invention contemplate retrofitting existing fuel dispensers to utilize mobile payment transactions. For example, an active sniffer may be installed between the pump electronics and existing forecourt controller to intercept messages flowing therebetween. The sniffer may also communicate with a remote (e.g., internet-based) server using suitable internet connectivity (e.g., over legacy cable connectivity). Once a mobile device having mobile payment capability is detected in proximity to the dispenser, a transaction can be initiated. The sniffer may receive pump control messages from the remote server and provide them to the pump electronics in the appropriate format. After the transaction is complete, the sniffer may provide transaction information to the local POS system for logging and reconciliation purposes.

Different systems and methods of the present invention utilize various combinations of the disclosed elements and method steps as supported by the overall disclosure herein.

Thus, combinations of elements other than those discussed above may be claimed. Moreover, the accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
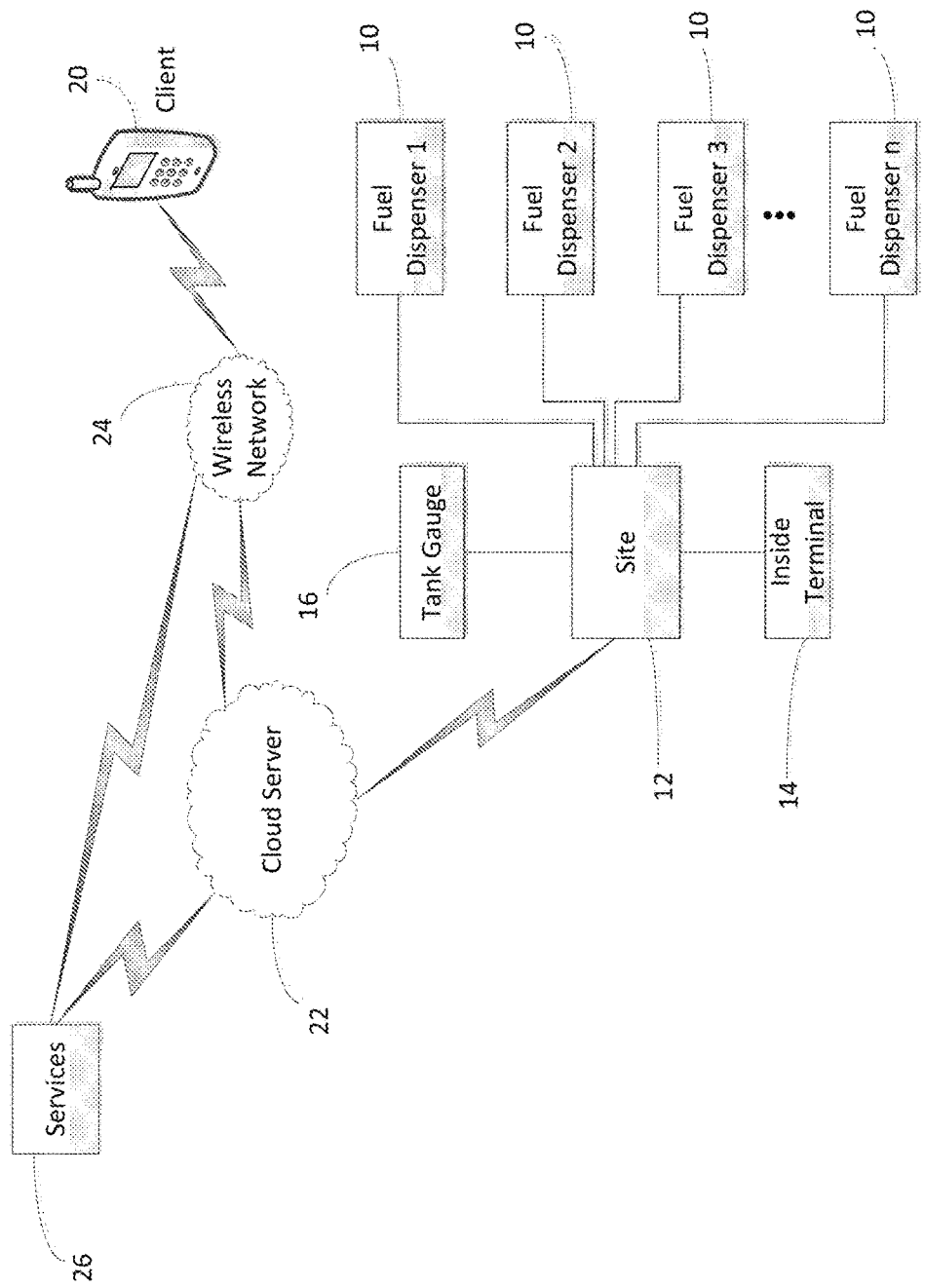
FIG. 1 is a diagrammatic representation of a retail fueling environment incorporating certain aspects of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

FIG. 1 illustrates a fuel dispensing environment having a plurality of fuel dispensers 10. The fuel dispensing environment will typically include a central building having a convenience store ("C-store") and also housing a POS system, forecourt controller, electronic payment server, and/or other devices to control fueling transactions. Such devices are collectively represented in this illustration as site 12. One or more inside terminals 14, which may comprise card readers and PIN pads, will also typically be provided. A tank gauge 16, used to monitor inventory in underground storage tanks containing fuel for the fuel dispensing environment, may also communicate with site 12.

In this example, each of the fuel dispensers 10 is retrofit to allow mobile payment. Toward this end, the customer's cell phone 20 is used to initiate a fueling transaction. Cell phone 20 may typically be a "smart phone" capable of running multiple and/or downloadable apps, such as those sold by Apple, Motorola, Samsung, HTC and others. Moreover, while a cell phone is one example of a wireless communication (mobile) device that may be used with embodiments of the present invention, other types of mobile devices may also be used for this purpose. For example, certain embodiments of the present invention may utilize various tablet computers.

To effect a mobile payment transaction, cell phone 20 will typically show an interface on its display with which the customer can interact. For example, the customer may choose a method of payment (rather than swiping a credit card at the dispenser) and indicate any limits on the transaction (such as $20). The interface may also be used to make other selections related to the transaction, such as fuel grade to be dispensed. Preferably, these preferences (e.g., fuel grade) may be stored as defaults so the customer does not need to choose them manually in subsequent transactions, unless a change is desired. If the customer is enrolled in a loyalty program, loyalty points may be accrued automatically without the need to swipe or scan a separate loyalty card. In addition, a receipt can be automatically sent to phone 20 at the conclusion of the transaction.

Referring again to FIG. 1, phone 20 communicates with a cloud server 22 via a wireless network 24 such as the digital cellular network (or local wifi). Cloud server 22 is also in communication with the respective fuel dispensers 10, either directly or via site 12 as shown. As one skilled in the art will appreciate, cloud server 22 may actually be a series of separate physical devices that communicate with each other via WAN or LAN. Advantageously, the scale of cloud server 22 can be easily adjusted as needed depending on anticipated volume of data. Various services 26 communicate with site 12 and/or phone 20 via cloud server 22. In some embodiments, it is contemplated that services 26 may communicate with phone 20 directly through wireless network 24, perhaps after a "hand-off" from cloud server 22.

Collectively grouped under the heading "services" are resources that may be used to effect the fueling transaction, or enhance the customer's experience in various ways. For example, a media partner that has a business relationship with the service station (or third party operator of cloud server 22) may provide media content to phone 20 or to the display of fuel dispenser 10 during the fueling transaction. A loyalty server may validate the customer's loyalty status, and keep track of any rewards that are due. For example, customers with higher levels of rewards may be entitled to an immediate fuel discount. Promotions, such as coupons or advertisements, may be provided during the fueling transaction (either to phone 20 or the display of fuel dispenser 10). The services will also typically include authorization for the mobile payment through one or more payment networks.

Figure 2:
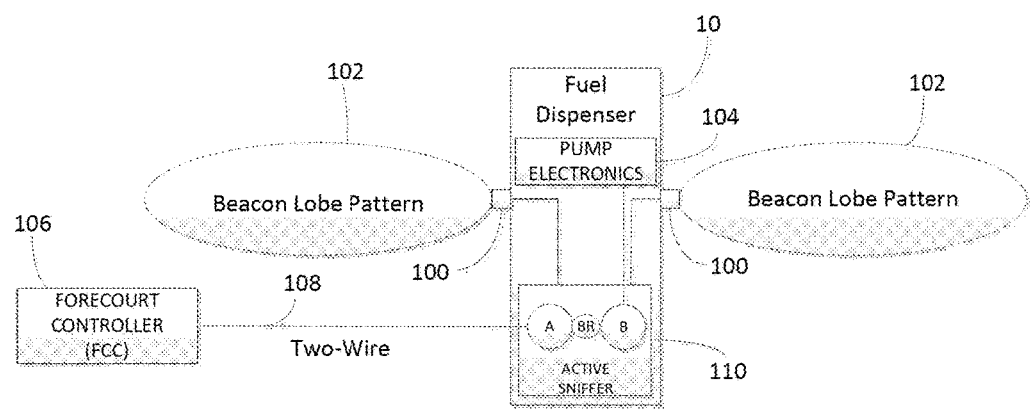
FIG. 2 is a diagrammatic representation of a fuel dispenser equipped with low power "beacons" and a sniffer device in accordance with an embodiment of the present invention.

Referring now to FIG. 2, certain additional aspects of the present invention will be explained. As can be seen, fuel dispenser 10 is in this case equipped with respective "beacons" 100 on the two sides from which fuel can be dispensed. It is contemplated that various radio frequency transceivers may be used as beacons 100, although many preferred embodiments may utilize Bluetooth low-energy (BLE) transceivers. Many newer phones are compatible with BLE, which has a shorter range than Bluetooth, and may not require pairing between components. As indicated at 102, beacons 100 are configured to have a relatively narrow radiation lobe pattern extending away from the respective sides of dispenser 100. The customer's phone would need to be located within the lobe pattern in order for communication to be established.

Depending on the embodiment, beacons 100 may be unidirectional or bidirectional. A unidirectional beacon will typically broadcast dispenser identification (ID) and perhaps other information or commands that can be used to facilitate a transaction. In this case, communication between phone 20 and the cloud server will typically occur via the digital phone network. On the other hand, if the beacon is capable of bidirectional communication and dispenser 10 is internet-enabled, phone 20 may send information to the cloud server through dispenser 10. This may be advantageous in areas where cell phone service is lacking or inconsistent.

As noted above, many existing fuel dispensers utilize low-data rate legacy cables, such as two-wire or RS422, to exchange messages with the forecourt controller and point-of-sale (POS) system located in the convenience store. In this embodiment, pump electronics 104 transmit signals to and receive signals from forecourt controller (FCC) 106 over two-wire ("TW") legacy cable 108. As is well-known, FCC 106 receives requests to initiate a transaction from pump electronics 104 and instructs pump electronics 104 to allow dispensing of fuel after the transaction has been authorized. When dispensing of fuel has been finalized, pump electronics 104 provides information on the volume and monetary amount of the dispensed fuel back to FCC 106 so that the transaction can be finalized.

Because the low frequency of two-wire communication limits the speed of data transfer, efforts have recently been made to utilize legacy wiring to provide high bandwidth communications, such as video advertising, to the dispensers. One such system is disclosed in U.S. Pub. App. No. 2013/0121428 ("the '428 application"), incorporated herein by reference in its entirety for all purposes. In accordance with the present invention, the dispenser will have enhanced and additional features while maintaining compatibility with equipment already installed at the fuel dispensing environment.

Figure 3:
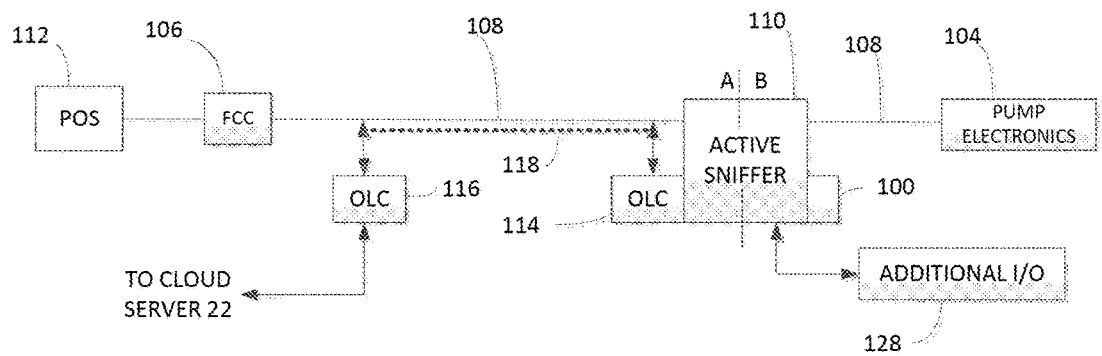
FIG. 3 is a diagrammatic representation showing installation of a sniffer device between existing electronics inside the pump and a forecourt controller in accordance with an embodiment of the present invention.

Aspects of the present invention may be incorporated into new dispensers at the time of manufacture, or may be added to existing dispensers as a retrofit. In the embodiment of FIG. 2, for example, an existing dispenser has been retrofit via the inclusion of an active sniffer 110. As shown, sniffer 110 is installed at an intermediate location along cable 108 between pump electronics 104 and FCC 106. Referring now also to FIG. 3, active sniffer 110 is an electronic device that intercepts messages appearing along cable 108 on either its "A" side or "B" side. Sniffer 110 includes a suitably-programmed processor (and associated memory) that determines whether the message should be passed along to the other side, or not. In some cases, sniffer 110 may substitute a different message for the one that was received, or provide a response that emulates a certain condition. This is in contrast to a purely passive sniffer, which would merely detect the messages flowing between pump electronics 104 and FCC 106.

As shown in FIG. 2, sniffer 110 includes software modules A and B which read and send messages at their respective sides according to the legacy format. In other words, module A acts as pump electronics 104 to FCC 106, whereas module B acts as FCC 106 to pump electronics 104. Another software module BR serves as a logical bridge to provide data buffering between sides A and B. A configuration file preferably stored in memory on sniffer 110 contains rules regarding the expected messages. This permits some messages to be passed between sides A and B on a synchronous basis, while other messages can be delayed, modified, or not passed.

In addition, sniffer 110 will preferably include a TCP/IP channel that can allow communication to cloud server 22, or any compatible on-site automation device (such as tank gauge 16). It will be appreciated that sensitive information transmitted to or from sniffer 110 can be suitably encrypted as necessary or desired. For example, communication with cloud server 22 can provide dispenser 10 with the capability of accepting mobile payment regardless of the brand or type of FCC already installed in the fueling environment. The mobile payment may be initiated, for example, when phone 20 is brought into lobe pattern 102 of a beacon 100. This technique allows the customer's mobile phone to detect the fueling position, thus enabling mobile payment and delivery of advertising media to the dispenser by proximity. (One skilled in the art will appreciate that other proximity technologies, such as NFC, RFID, etc. may also be used in various embodiments of the present invention.) In the case of a retrofit, this proximity and mobile payment capability can be added to existing dispensers already installed in the field.

Sniffer 110 can provide various messages to the existing FCC which allow the mobile payment transaction to occur under the control of cloud server 22. For example, assuming the dispenser is engaged in a mobile transaction, sniffer 110 can inform the FCC that the dispenser is "Idle." Alternatively, if the FCC is programmed to recognize a small set of new messages, the sniffer can inform the FCC that the dispenser is under "cloud control." Once the mobile payment transaction is complete, sniffer 110 could provide details of the transaction to FCC 106 in a manner that can be logged by the store's point-of-sale (POS) system 112. This may be responsive to a standard status request issued by FCC 106 on a periodic (e.g., polling) basis. As an alternative, or in addition, the mobile sales information could be stored on cloud server 22 and accessed when the store operator logs into a previously-created account.

Figure 4:
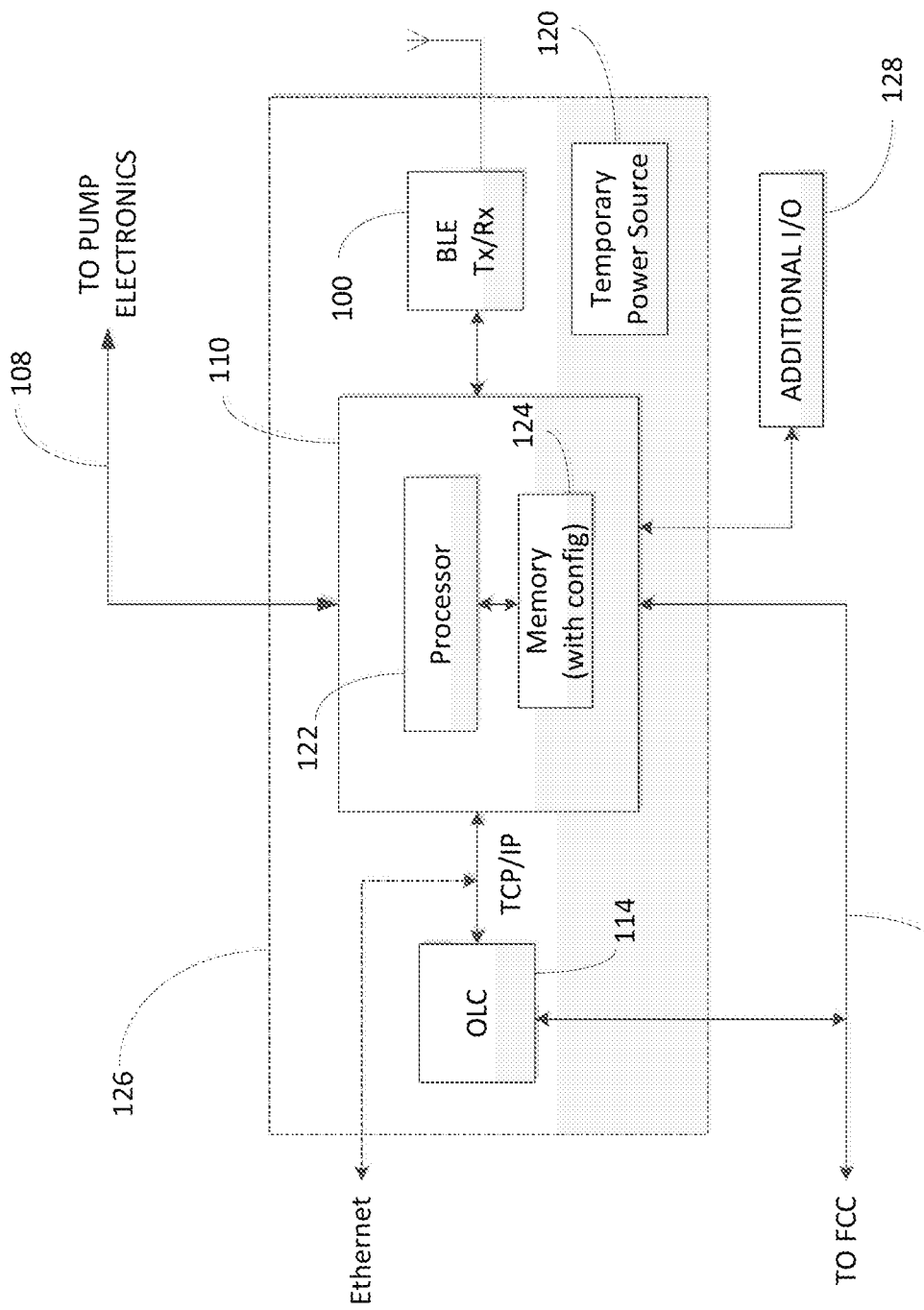
FIG. 4 is a diagrammatic representation of an active sniffer device in accordance with an embodiment of the present invention.

Referring to FIGS. 3 and 4, certain additional aspects of sniffer 110 will be described. As noted above, sniffer 110 preferably provides a TCP/IP channel which permits high speed communication between it and cloud server 22 (or an on-site automation device). This may be accomplished by various wireless techniques, such as wifi, Zigbee, or other mesh network technology. In attended markets, for example, the attendant's handheld can be configured as a mobile "hotspot" which communicates with the fuel dispenser via wireless connection. In other words, the dispenser in this case will rely on the handheld's internet connection to provide the desired functionality to the dispenser.

Often, however, it will be desirable to provide a wired connection to sniffer 110 to ensure more reliable connectivity. For example, high speed data communication may be provided over legacy cable 108, such as using DSL or HomePlug techniques. In this regard, the illustrated embodiment provides a first over legacy cable (OLC) modem 114 connected to a suitable port of sniffer 110. A second OLC modem 116 is located away from fuel dispenser 10, such as inside the convenience store. As indicated at 118, high bandwidth network communications are transmitted on cable 108 along with the lower frequency two-wire signals transmitted to and from FCC 106. Modem 116 is connected to a suitable router or gateway that provides communication with cloud server 22.

Alternatively, as shown in FIG. 4, the TCP/IP connection may be provided via Ethernet cable. In many cases, however, the use of Ethernet cable will not be the preferred option due to the difficulty of running new cable in existing installations. As noted, OLC modem 114 allows a new dispenser equipped with sniffer 110, or an existing dispenser retrofit with a kit including sniffer 110, to utilize advantageously the legacy two-wire cable already in place under the service station's forecourt.

One or more beacons 100 are also connected to sniffer 110 via suitable ports. For example, the beacons may be configured as Bluetooth BLE dongles attached to USB ports on sniffer 110. A temporary power source 120 is preferably provided to ensure continued operation of sniffer 110 during a power outage, at least for a time sufficient to ensure that all necessary messages have been transmitted away from or through sniffer 110. For example, certain information, such as the amount of fuel dispensed or the accrued monetary total for the fuel dispensed, is considered to be "mission critical" information. Such information is subject to various requirements intended to ensure its preservation in the event power is lost.

As also shown in FIG. 4, sniffer 110 includes a suitable processor that communicates with an on-board memory 124. Memory 124, which may be one or more physical devices in actual practice, preferably has volatile and nonvolatile aspects. In some cases, for example, some or all of memory 124 may be located on the same chip as processor 122 (which will generally also include cache memory to facilitate its operation). The configuration file ("config") is preferably stored in nonvolatile memory of memory 124. Sniffer 110, along with beacon 100 and OLC modem 114, can be conveniently packaged together in a retrofit kit 126 for installation in an existing fuel dispenser.

In a preferred embodiment, the sniffer is configured so that it will not operate unless loaded with authentic (i.e., authorized) firmware. For example, due to regulatory environments in many jurisdictions, it may be necessary for any firmware run on the sniffer to be approved by Weights & Measures (W&M). In this regard, a suitable anti-tampering chip, such as the USIP chip supplied by Maxim Integrated Products of Austin, Tex., may be utilized. The anti-tampering chip preferably sits between the general sniffing application and one of the serial channels, like a "secure lock." If the firmware is not authentic, the secure chip will keep the door locked and make impossible any communication. In addition, unique private certificates will be stored inside an anti-tampering area. This allows a secure identification of the device against the cloud server 22, avoiding possibility of cloning. To achieve that, the anti-tampering chip may store the keys inside a very secure, anti-tampering area: the keys will be destroyed in any attempt to get to them. Preferably, the communication will be directly from this chip and cloud server 22 and is thus very secure.

Figure 5:
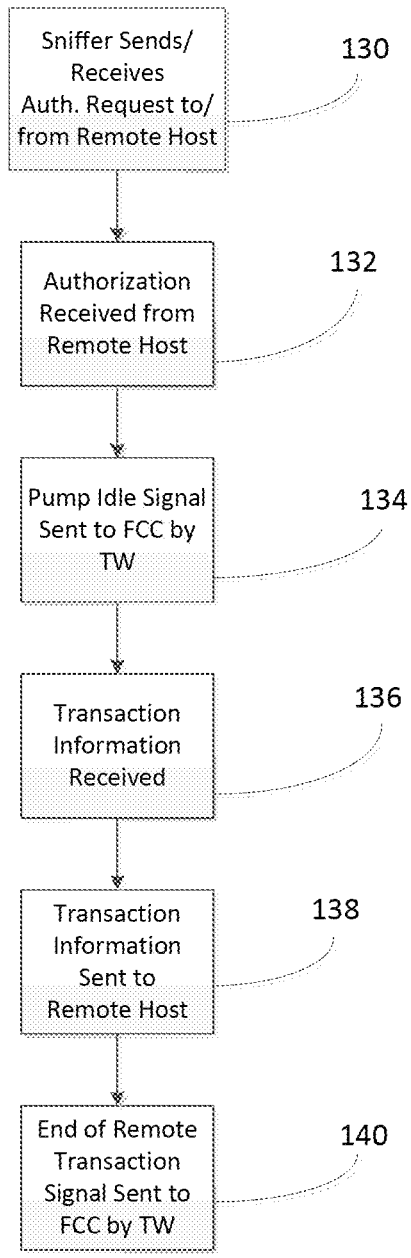
FIG. 5 is a flow chart showing exemplary process steps occurring at a sniffer device of the present invention during remote transaction authorization.

Referring now to FIG. 5, a mobile transaction may be initiated when the customer's phone receives dispenser identification information from beacon 100. Depending on the configuration of the mobile system, sniffer 110 will either receive an initiation signal from cloud server 22, or will send an authorization request to cloud server 22. Both of these scenarios are encompassed in the first step 130. In either case, the app installed on the phone will typically provide payment information (and preferably also loyalty information) to cloud server 22. This may be accomplished via the digital cell phone network, or using the dispenser's internet connection if bidirectional communication occurs at beacon 100.

Once the transaction is authorized (shown at step 132), cloud server 22 instructs pump electronics 104 to allow fueling to begin. During this time, sniffer 110 may provide suitable messages to FCC 106 indicating that a mobile payment transaction is in progress (e.g., "Dispenser Enabled By Remote Cloud Payment Controller") or, if forecourt controller 106 is not programmed to understand this message, simply that the dispenser 10 is "Idle" (indicated at step 134). Either way, it will be appreciated that the mobile payment transaction is authorized and is controlled independently of FCC 106 and POS 112. This independent control provides various operational advantages and enhanced functionality while also providing backward compatibility. For example, as discussed in more detail below, transaction information for analytical purposes can be obtained directly from the dispenser without the need to interface with POS 112 (which may have been supplied by any one of many vendors).

After dispensing is completed, pump electronics 104 provide information regarding the volume and monetary amount of the fuel that was dispensed (indicated at step 136). This signal is intercepted by sniffer 110, and the requisite information is provided to cloud server 22 in order to finalize the transaction (indicated at step 138). Assuming FCC 106 and POS 112 have been suitably programmed, sniffer 110 may send a signal after the transaction is finalized which allows POS 112 to log the transaction (e.g., "Delivered 12.4 Gallons by Mobile Payment. Transaction ID is 42BH0124.") (indicated at step 140). As noted above, if the existing site equipment is not equipped to understand this message, the service station operator can obtain the same information manually by logging in to cloud server 22.

The internet connection of sniffer 110 can provide existing dispenser 10 with additional new functionality unrelated to payment. This new functionality is diagrammatically represented in FIG. 4 as Additional I/O 128. For example, various sensors, cameras or other devices that are useful to detect fraud occurring at the dispenser may communicate with POS 112 or cloud server 22 via sniffer 110. Such other devices might include, for example, door switches and remote locks to restrict or control access to the interior of the dispenser's housing.

In addition, sniffer 110 may allow various maintenance functions to be achieved by remote control, or operational information about dispenser 10 to be shared with cloud server 22 or on-site automation equipment. These functions may be based on commands received from another device over the TCP/IP channel, or based on commands originating in the configuration file of sniffer 110. Such commands might include, for example, remote reboot, remote calibration, firmware updates, or remote changing of dispenser parameters. It will be appreciated that any such requests may be injected on side B of sniffer 110 while the FCC is fed a "placeholder" message (such as a message indicating the pump is "Idle"). Because sniffer 110 "masks" the activity occurring on the dispenser side, long delays that could cause timeout errors or other errors at FCC are avoided.

For example, technicians are generally required under current practice to open the dispenser's cabinet and physically connect a laptop computer or the like to the dispenser's internal electronics in order to change metrological settings. Active sniffer 110 could allow the technician to make these changes using a smart phone or tablet computer that is not physically connected to the dispenser, assuming an appropriate validation protocol is implemented to prevent fraud. Another example is real-time reporting of dispenser information such as that stored in the electronic totalizer. This information provides the units (e.g., gallons) of fuel sold since the pump was installed, which can be used for antifraud or weights and measures (W&M) reasons. In fact, transaction information detected by sniffer 110 can be sent to tank gauge 16 in real-time (or near real-time) for purposes of inventory reconciliation. Specifically, this information can be used along with information regarding current levels of fuel in an underground storage tank (determined by a tank gauge) and information regarding additions to the underground storage tank (e.g., from fuel delivery trucks), to facilitate inventory tracking and control. This also facilitates more immediate detection of leaks or other losses in the fuel delivery system.

As noted above, an important advantage realized in many embodiments of the present invention is backward compatibility with FCCs or fuel dispensers from various manufacturers. In order to achieve more seamless operation, the configuration file of sniffer 110 preferably defines protocols to avoid conflicts with the existing two-wire communication. For example, timeout errors could occur if the FCC requests dispenser status during long periods of remote activity. So, as noted above, the FCC can be informed that the dispenser is "idle" during a remote transaction. Other situations require more complex protocols, such as if a remote command comes in while a traditional fueling transaction is in process.

Figure 6:
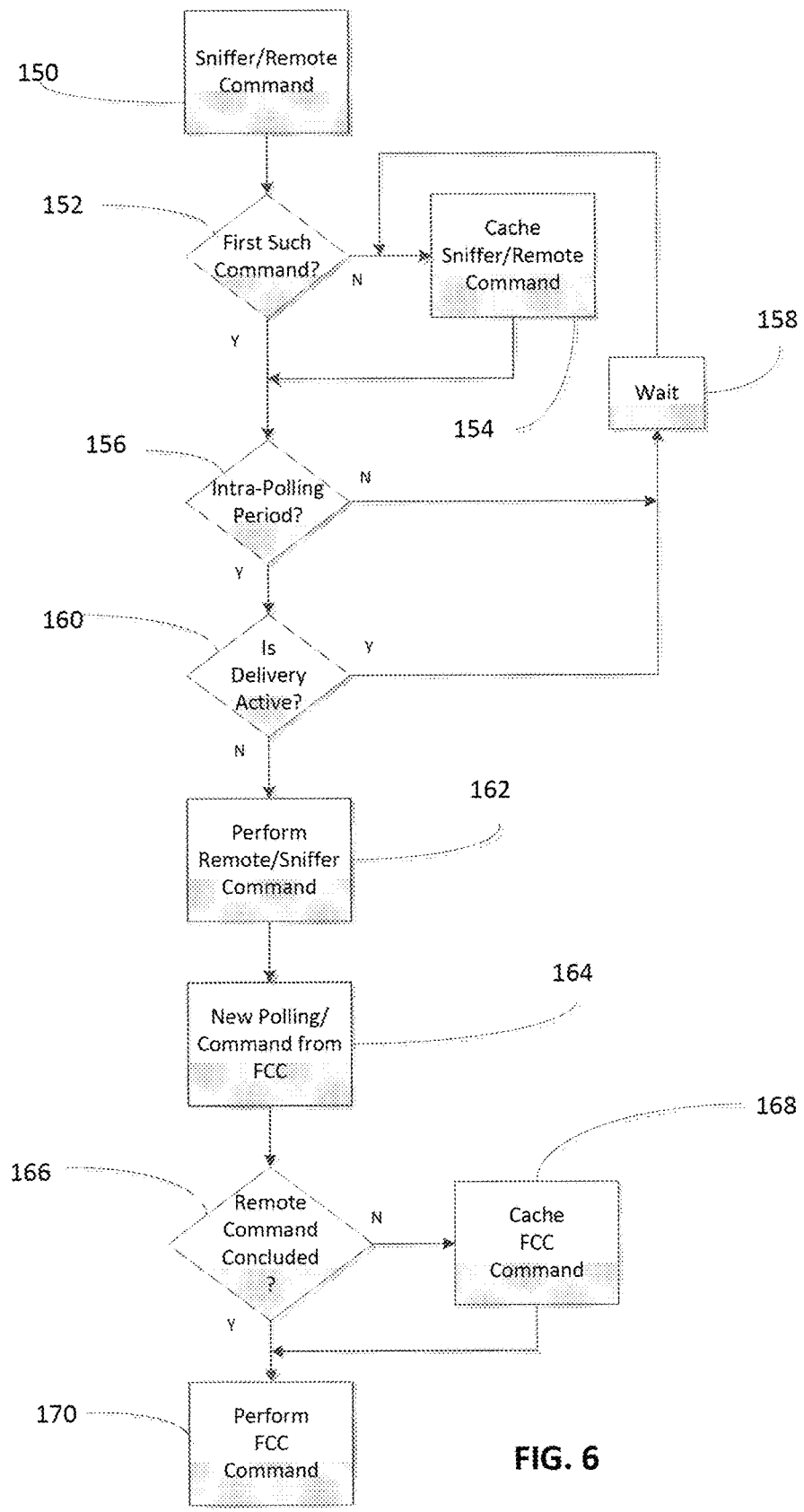
FIG. 6 is a flow chart showing an exemplary messaging protocol that may be implemented at a sniffer device in accordance with the present invention.

In this regard, FIG. 6 illustrates a protocol that might be employed to mitigate message conflicts that could otherwise occur during the operation of sniffer 110. As shown at 150, the process begins when a remote command is received or a predefined command is initiated in sniffer 110 itself. As indicated at 152, sniffer 110 determines whether this command is the first sniffer/remote command in queue. If not, meaning there are other active commands in process, it is cached (as indicated at 154) until it can be performed.

If the sniffer/remote command is the first (meaning no others are already in queue), sniffer 110 determines (as indicated at 156) if the FCC is in a intra-polling period. In other words, is the FCC in a quiet time between periodic status checks of the forecourt dispensers? If not, sniffer 110 waits for an intra-polling period (as indicated at 158). If so, sniffer 110 determines whether delivery is active due to an ongoing traditional fueling transaction (as indicated at 160). If delivery is active, sniffer 110 waits (as indicated at 158) until the traditional transaction is completely finalized.

Assuming all conditions for allowing the sniffer/remote command to proceed are satisfied, it may be performed (as indicated at 162). During the performance of this command, it is possible that a new polling request or other command may be received from the FCC (as indicated at 164). It is then determined, as indicated at 166, whether the operation initiated by the sniffer/remote command is ongoing or concluded. If not, it may be necessary to cache the FCC command for a short period of time (as indicated at 168). Once the sniffer/remote command is concluded (if not already concluded), the FCC message is passed to the dispenser so that it may be performed (as indicated at 170). The response from the dispenser is thus passed back to the FCC generally on a synchronous basis.

It can thus be seen that the present invention provides various apparatus and methods relating to installation and use of a sniffer in a fueling equipment. As a result, legacy equipment can be upgraded to provide additional features (such as mobile payment) or additional functionality useful to the operator of the service station. One skilled in the art will appreciate that various methodologies described in U.S. Pub. No. 2013/0246171 ("the '171 application") may be practiced according to the techniques discussed herein. Accordingly, the '171 application is incorporated herein by reference in its entirety for all purposes.

While one or more preferred embodiments of the invention have been described above, it should be understood that any and all equivalent realizations of the present invention are included within the scope and spirit thereof. While much of the discussion above has involved fuel as the exemplary product being dispensed, one skilled in the art will recognize that aspects of the present invention are applicable to a wide variety of different goods and services. Thus, the embodiments depicted are presented by way of example only and are not intended as limitations upon the present invention. For example, many aspects of the present invention are described above in the exemplary context of a retail fueling environment. It should be understood by those of ordinary skill in this art, however, that the present invention is not limited to these embodiments because other commercial environments are contemplated and modifications can be made. Therefore, it is contemplated that any and all such embodiments are included in the present invention as may fall within the scope and spirit thereof.

What is claimed is:

1. An assembly for installation in a fuel dispensing environment comprising:
   a first communication connection configured to be in electrical communication with a forecourt controller and a second communication connection configured to be in electrical communication with pump electronics of a fuel dispenser, wherein the first communication connection and second communication connection are configured to be disposed along a fueling environment legacy cable;
   a processor and a memory including computer program code, the memory and the computer program code configured to, with the processor, cause the assembly to:
      receive a legacy incoming message at either said first communication connection or said second communication connection;
      interpret said incoming message and determine an action to be taken regarding said incoming message based on an interpretation of the incoming message, utilizing a set of rules for expected messages, wherein the set of rules is based on a legacy format of the forecourt controller in electrical communication via the first communication connection and a legacy format of the pump electronics in electrical communication via the second communication connection;
      cause the action regarding the incoming message to be executed by the pump electronics or the forecourt controller.

2. An assembly as set forth in claim 1, wherein an action to be taken regarding said incoming message includes passing said incoming message immediately to the other side, delaying said incoming message, or not passing said incoming message to the other side.

3. An assembly as set forth in claim 2, further comprising:
   a broadband communication channel connection configured for network communication between said assembly and at least one external device.

4. An assembly as set forth in claim 3, wherein said external device comprises a remote cloud server, and said assembly is operative to receive transaction authorization from said remote cloud server and activate said fuel dispenser based on same.

5. An assembly as set forth in claim 4, wherein said memory and the computer program code are further configured to provide sale and volume information received from said fuel dispenser to said remote cloud server at the conclusion of a fueling transaction.

6. An assembly as set forth in claim 3, wherein said memory and the computer program code are further configured to provide ongoing volume information received from said fuel dispenser during a fueling transaction to said external device via said broadband communication channel.

7. An assembly as set forth in claim 3, further comprising:
an over legacy cable (OLC) modem in electrical communication with said broadband communication channel.

8. An assembly as set forth in claim 3, wherein said memory and the computer program code are further configured to receive remote messages at said broadband communication channel and determine an action to be taken in relation to said remote messages.

9. An assembly as set forth in claim 8, wherein said memory and the computer program code are further configured to implement a protocol in the event a remote message is received while action pursuant to a previous remote or incoming message is in process.

10. An assembly as set forth in claim 1, further comprising:
a wireless proximity transmitter operative to provide dispenser identification to a customer's mobile device.

11. An assembly as set forth in claim 1, wherein said assembly further comprises:
at least one port for messages to or from additional input/output devices associated with said fuel dispenser.

12. A retrofit kit for installation in a fuel dispenser, said retrofit kit comprising:
a first communication connection configured to be electrically connected to a forecourt controller and a second communication connection configured to be electrically connected to pump electronics of a fuel dispenser, wherein the first communication connection and second communication connection are configured to be disposed along a fueling environment legacy cable;
an over legacy cable modem in operative communication with a broadband communication channel to provide such broadband communication to at least one external device via said legacy cable;
a wireless proximity transmitter operative to provide dispenser identification to a customer's mobile device; and
a processor and a memory including computer program code, the memory and the computer program code configured to, with the processor, cause the apparatus to:
receive a legacy incoming message at either said first communication connection or said second communication connection;
interpret said incoming message and determine an action to be taken regarding said incoming message based on an interpretation of the incoming message, utilizing a set of rules for expected messages, wherein the set of rules is based on a legacy format of the forecourt controller in electrical communication via the first communication connection and a legacy format of the pump electronics in electrical communication via the second communication connection;
cause the action regarding the incoming message to be executed by the pump electronics or the forecourt controller.

13. A retrofit kit as set forth in claim 12, wherein said external device comprises a remote cloud server, and said memory and the computer program code are further configured to receive transaction authorization from said remote cloud server and activate said fuel dispenser based on the transaction authorization.

14. A retrofit kit as set forth in claim 13, wherein said memory and the computer program code are further configured to provide sale and volume information received from said fuel dispenser to said remote cloud server at the conclusion of a fueling transaction.

15. A retrofit kit as set forth in claim 13, wherein said memory and the computer program code are further configured to provide ongoing volume information received from said fuel dispenser during a fueling transaction to said remote cloud server via said broadband communication channel.

16. A retrofit kit as set forth in claim 12, wherein said memory and the computer program code are further configured to receive remote messages at said broadband communication channel and determine an action to be taken in relation to said remote messages.

17. A retrofit kit as set forth in claim 12, wherein said memory and the computer program code are further configured to implement a protocol in the event a remote message is received while action pursuant to a previous remote or incoming message is in process.

18. A retrofit kit as set forth in claim 12, wherein said retrofit kit further comprises:
at least one port for messages to or from additional input/output devices associated with said fuel dispenser.

19. A method of controlling a fuel dispenser operative to transmit and receive messages along legacy cable between pump electronics of the fuel dispenser and a remote forecourt controller, said method comprising steps of:
providing a device comprising a first communication connection configured to be electrically connected to said forecourt controller and a second communication connection configured to be electrically connected to said pump electronics, said device further having a broadband communication channel for broadband communication with a remote cloud server, wherein the first communication connection and second communication connection are disposed along a fueling environment legacy cable;
receiving a legacy incoming message at either said first communication connection or said second communication connection;
interpreting, by a processor, said incoming message and determining an action to be taken regarding said incoming message based on an interpretation of the incoming message, utilizing a set of rules for expected messages, wherein the set of rules is based on a legacy format of the forecourt controller in electrical communication via the first communication connection and a legacy format of the pump electronics in electrical communication via the second communication connection;
causing the action regarding the incoming message to be executed by the pump electronics or the forecourt controller;
receiving a host command from said remote cloud server at said device via said broadband communication channel;

interpreting said host command at said device based on information stored in a memory of said device; and providing a selected pump message to said pump electronics via said legacy cable based on said interpretation of said host command.

20. A method as set forth in claim 19, further comprising the step of providing a selected controller message to said forecourt controller based on said host command.

21. A method as set forth in claim 19, wherein said host command comprises authorization for a fueling transaction to commence and said selected pump message comprises an emulated forecourt controller message.

22. A method as set forth in claim 19, further comprising step the steps of:

receiving sales and volume data from said pump electronics at said device via said legacy cable; and sending said sales and volume data to said remote cloud server via said broadband communication channel.

23. A fuel dispenser comprising:

pump electronics operative to control fueling operations of the fuel pump; and a device in electrical communication with said pump electronics, via a second communication connection, and to legacy cable in a forecourt of a fueling environment, via a first communication connection, so as to provide electrical communication with a forecourt controller;

said device comprising:

a broadband communication channel connection to a remote cloud server; and a processor and a memory including computer program code, the memory and the computer programming code configured to, with the processor, cause the apparatus to:

receive a legacy incoming message at either said first communication connection or said second communication connection;

interpret said incoming message and determine an action to be taken regarding said incoming message based on an interpretation of the incoming message, utilizing a set of rules for expected messages, wherein the set of rules is based on a legacy format of the forecourt controller in electrical communication via the first communication connection and a legacy format of the pump electronics in electrical communication via the second communication connection;

causing the action regarding the incoming message to be executed by the pump electronics or forecourt controller; and provide legacy messages to said forecourt controller and communicate with a remote cloud server via said broadband communication channel; and a housing containing said pump electronics and said device.

* * * * *